United States Patent [19]
Binder

[11] 3,919,887
[45] Nov. 18, 1975

[54] LIQUID FLOW METER

[75] Inventor: Karl Binder, Stuttgart, Germany

[73] Assignee: Firma Johann Baptist Rombach, Karlsruhe, Germany

[22] Filed: Apr. 22, 1974

[21] Appl. No.: 463,195

[30] Foreign Application Priority Data
Apr. 21, 1973 Germany............................ 2320568

[52] U.S. Cl.................................. 73/251; 91/338
[51] Int. Cl.²....................................... G01F 11/38
[58] Field of Search......... 73/250, 251, 270; 91/338

[56] References Cited
UNITED STATES PATENTS

| 12,934 | 5/1855 | Barden................................... 73/251 |
| 274,879 | 3/1883 | Barton et al........................... 73/251 |
| 2,073,405 | 3/1937 | Horton................................... 73/251 |
| 3,220,257 | 11/1965 | Douglas................................. 73/251 |
| 3,821,898 | 7/1974 | Tatsuno................................. 73/251 |

FOREIGN PATENTS OR APPLICATIONS

| 704,573 | 4/1941 | Germany............................... 73/251 |
| 242,639 | 10/1926 | United Kingdom................... 73/251 |

*Primary Examiner*—James J. Gill
*Attorney, Agent, or Firm*—Bacon & Thomas

[57] ABSTRACT

A liquid flow meter, especially for small flow volumes, in which a reciprocating metering piston operates a toggle mechanism connected to a rotary disc valve with two spring-loaded discs contacting opposite faces of a dividing wall, the valve reversing the liquid flow to and from the metering chambers on both sides of the piston in a quick motion generated by the toggle mechanism, the same motion being transmitted to a mechanical or electronic counter.

28 Claims, 17 Drawing Figures

LIQUID FLOW METER

BACKGROUND OF THE INVENTION

1. Field of the Invention

The present invention relates to liquid flow meters, and in particular to liquid flow meters for small flow volumes which are adapted for direct incorporation into a suction-operated or pressure-operated supply line, such as the fuel line of an internal combustion engine.

2. Description of the Prior Art

Known liquid flow meters have two metering chambers which are separated by either a metering piston or a metering membrane. The controlling design criteria for this type of metering apparatus are the mechanical friction resistance created by the metering mechanism and the dynamic flow resistance to which the liquid medium itself is subjected during the filling and emptying of the metering chambers. These resistances determine a certain pressure differential on the two sides of the member separating the metering chambers, the allowable pressure differential being limited by the feed pressure, or suction, of the liquid medium. Thus, in order to overcome the internal friction losses of the device, in order that the meter be self-starting, would tend to favor large effective surfaces on the movable member separating the metering chamber, in conjunction with a relatively short stroke.

Another important criterion for small-volume liquid flow meters is the necessity of an absolutely leak-proof seal between the two metering chambers. In the case of piston-type separating members, this criterion would require extremely close manufacturing tolerances, making the parts more susceptible to operating problems, especially in situations where the liquid medium contains particulate impurities and where considerable variations in temperature can occur. Lastly, both the tighter tolerances by themselves, and the tendency of impurities to gum up the moving parts, tend to raise the pressure differential which is necessary to overcome the increased friction. This type of liquid flow meter is therefore only to a limited extent suitable for use in conjunction with fuel feed lines of internal combustion engines.

An additional shortcoming of these prior art flow meters is related to the fact that they have very small reciprocation amplitudes of the separating member and that even very small changes in this amplitude reduce considerably the accuracy of the apparatus. This disadvantage, which is attendant to short-stroke separating members, is particularly evident in connection with flexible membrane members. The latter have the still further disadvantage that the continuous working of the membrane may cause aging of its material, and that the sensitivity of the membrane material to temperature changes may affect its elasticity characteristics.

SUMMARY OF THE INVENTION

It is a primary objective of the present invention to suggest an improved liquid flow meter of the above-mentioned type, especially one for small flow volumes, as is the case in fuel feed lines of internal combustion engines for automobiles, fuel feed lines for oil heating systems, and the like, where rough operating conditions such as vibrations and impact forces exist, and where the apparatus is exposed to wide variations in temperature.

The present invention proposes to attain the above objective, by suggesting a liquid flow meter which is directly mountable in a feed line of the suction or pressure-type, and in which two separate metering chambers communicate with two separate valve chambers between which is arranged a rotary disc valve, the two metering chambers being separated by a reciprocating metering piston. A disc valve, arranged between the two valve chambers, is switchable by means of a toggle mechanism which is triggered by the motion of the metering piston. Thus, when the metering piston reaches one of its end positions, it triggers a quick switching action on the rotary disc valve, thereby reversing the liquid flow to the metering chambers via the valve chambers, every reversal of the piston motion being indicative of a given volume of liquid having passed through the apparatus. The rotary switching action of the disc valve is conveniently transmittable to either a mechanical counter or a remotely placed electronic digital counter.

One particular advantage of the present invention relates to the fact that only a minimal pressure differential in the metered medium is required for driving the reversing mechanism. This feature means a wide range of possible applications for the novel apparatus. The use of a toggle mechanism for the reversing action has the advantage that it permits storage of the necessary reversing energy, derived from the kinematic energy of the metering piston which, at the time of the desired reversing action, is released by the toggle mechanism in a quick switching action which also initiates the metering pulse for the mechanical or electronic counter, thereby assuring high metering accuracy.

The metering piston is preferably molded of a suitable plastic material and includes means for adjusting the length of its metering stroke, i.e. the precise volume of liquid passed through the apparatus per metering pulse. This adjustment is conveniently obtainable as an adjustment of the distance between two abutment members with which the metering piston drives the toggle mechanism for the switching of the rotary disc valve. Through this convenient adjustability of the flow volume per piston stroke it is possible to obtain an accurace calibration of the metering apparatus to a desired flow volume per pulse. Since the abutment members on the metering piston engage the toggle mechanism only in the end portions of the piston stroke, the piston is subjected to only a minimal sliding friction during the major portion of its stroke, the kinematic energy of the moving piston and of the moving liquid being utilized to push the trigger mechanism over dead center. Only when it is at or near dead center, does the toggle mechanism engage the rotary valve, the force derived from the moving metering piston and the added stored energy of the toggle mechanism being utilized to obtain a quick switching action on the rotary disc valve and to transmit a counting pulse.

This advantageous structure of the apparatus, in which the distance between the abutting members of the metering piston is conveniently adjustable for the calibration of the metering stroke, and in which the major portion of the displacement of the metering piston is subject to only a minimum of friction, permits operation of the apparatus of the invention under even a very low liquid feed pressure or feed suction. The use of the kinematic energy of the metering piston and of the liquid medium itself to move the toggle mechanism to dead center, without yet moving the rotary disc valve, amounts to a storage of energy, prior to the actual valve switching action, for which both the piston-derived energy and the stored energy are then utilized. Thus, the switching action and the metering pulse are obtained in the form of a quick, forceful motion, eliminating the risk of the metering valve, or any other part of the mechanism becoming stuck half-way through the valve switching motion.

In a further development of the invention, it is suggested that the rotary disc valve include two valve channels arranged in parallel to the central valve shaft, the opposite openings of the valve channels being alternatingly covered and uncovered by two valve discs. These discs are keyed to the valve shaft and spring-biased against oppositely facing flat surfaces which contain the valve channel ports, so that the opening and closing action requires a minimum of motion and energy. This arrangement also makes it possible for the valve elements to be lifted from the valve channel ports against their spring bias, in the event of a pressure surge in the liquid medium, thereby protecting the toggle mechanism from excessive strain. Thus, if it should happen that high friction conditions exist between the valve discs and the valve faces - due to a prolonged period without movement of the liquid, for example - the toggle mechanism will be protected against damage, by the disc valves lifting from their seats, until they are freed to resume their normal rotary reciprocating motion. This novel feature contrasts advantageously to known gate-type slide valves in which all valve ports are closed from the same side, and where, under a startup pressure surge, the valve member is not liftable from the valve channel ports, so that the fuel flow is permanently blocked.

A still further advantage of the invention relates to a suggested bypass channel extending across the dividing wall of the housing which contains the rotary disc valve. This bypass channel is normally closed by means of a spring-loaded stop cock, but can be opened for purposes of bleeding the apparatus, or it can be used to short-circuit the metering function of the apparatus. It may also be calibrated to serve as a safety valve, in the event of malfunction of the apparatus, in which case the cock opens automatically against its spring. It is also advantageous to use this bypass, when the flow meter is started up from the empty condition, and when no counter-pressure is present from the outlet side, in which case it could happen that the delicate toggle mechanism is subjected to excessive forces.

BRIEF DESCRIPTION OF THE DRAWINGS

Further special features and advantages of the invention will become apparent from the description following below, when taken together with the accompanying drawings, which illustrate, by way of example, an embodiment of the invention, represented in the various figures as follows:

FIG. 4a is a representation similar to FIG. 4, showing a modified embodiment of the safety bypass of FIG. 1;

FIG. 7a is a plan view of the piston of FIG. 7;

FIG. 7b shows a partial longitudinal cross section of the piston of FIG. 7 in a different direction;

DESCRIPTION OF THE PREFERRED EMBODIMENT

Figure 1:
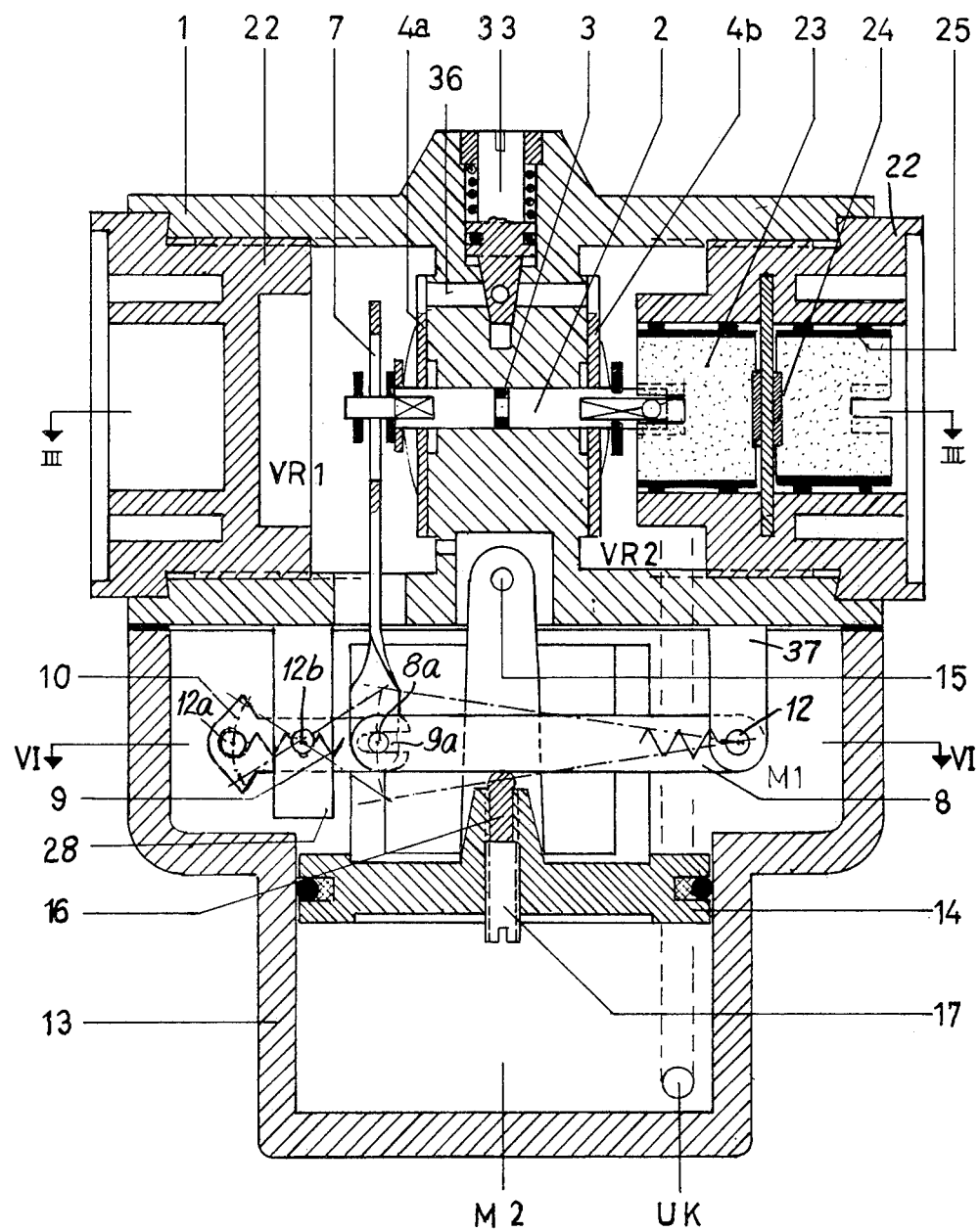
FIG. 1 shows in an enlarged elevational cross section a liquid flow meter embodying the invention.
Figure 3:
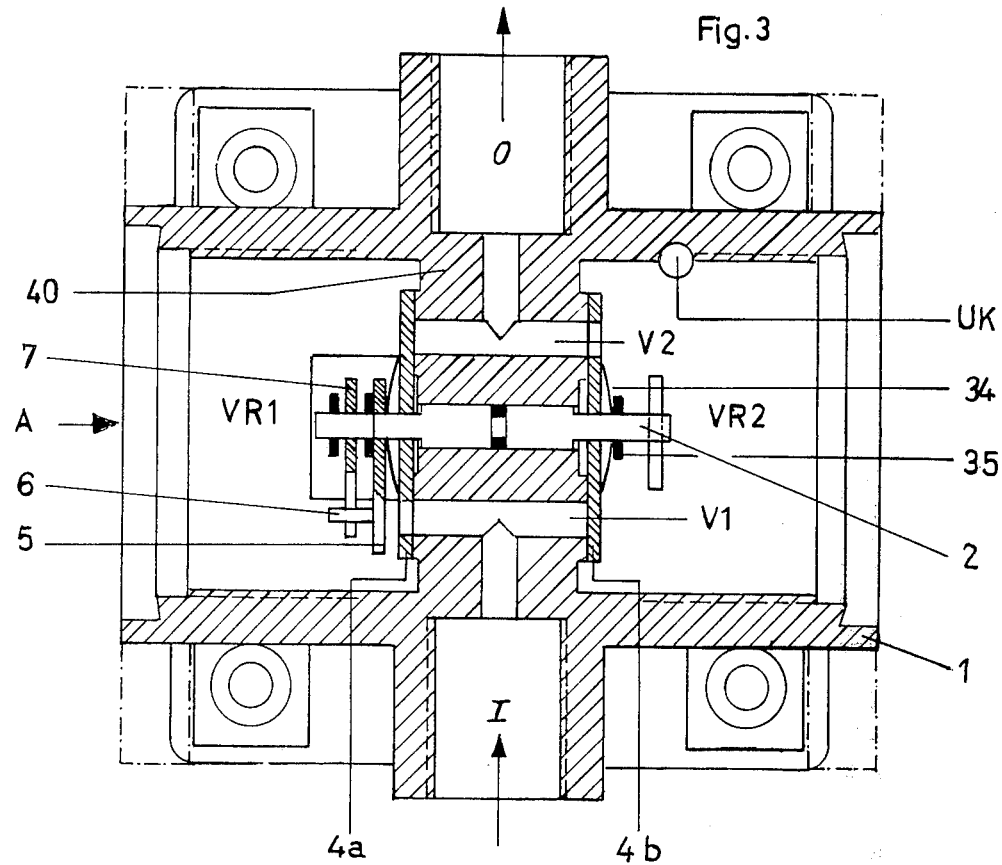
FIG. 3 is a horizontal cross section through the apparatus of FIG. 1, along line III—III thereof, with the end plug removed.

Referring to the drawing, FIG. 1 shows an apparatus embodying the invention comprising a valve housing 1 as the upper part of the apparatus and a cylinder housing 13 as the lower part of the apparatus, the two housing portions being attached together to form a single compact unit. The valve housing 1 is subdivided by a central transverse dividing wall 40 into two separate valve chambers VR1 and VR2 (see also FIG. 3). As can be seen in FIG. 3, the valve housing 1 further includes an inlet port I and and outlet port O, both ports being, for example, threaded bores to which appropriate connectors of a fuel line for an internal combustion engine, or the like, may be connected. The dividing wall 40 includes two longitudinal valve channels V1 and V2, channel V1 being connected by a transverse bore to the inlet port I, while channel V2 is connected by a similar bore to the outlet port O.

The two valve channels V1 and V2 open into the two valve chambers VR1 and VR2 at oppositely located flat faces of the dividing wall 40, against which two rotatable valve discs 4a and 4b abut so as to form a rotary disc valve 4. The valve discs 4a and 4b are biased against the respective faces of the dividing wall 40 by means of thin spring washers 34 which are retained on a central valve shaft 2 by means of suitable snap retainers 35. Each of the valve discs 4a and 4b has two bores located at a radius from the valve shaft 2 corresponding to the distance of the valve channels V1 and V2 therefrom. However, while the valve channels V1 and V2 are diametrally opposite each other in relation to shaft 2, the two bores of the discs 4a and 4b are arranged at such an angle in relation to shaft 2 that only one of the openings can be brought into alignment with a valve channel to establish communication between the latter and a valve chamber VR1 or VR2, respectively, while the other valve channel is closed by the valve disc. The two valve discs, in turn, are angularly so arranged on the valve shaft 2 that, as they open one valve channel to one valve chamber, they open the other valve channel to the opposite valve chamber, and vice versa. As seen in FIG. 3, for instance, the valve channel V1 of the inlet side is opened to the valve chamber VR1 and the valve channel V2 of the outlet side is opened to the valve chamber VR2.

Figure 4:
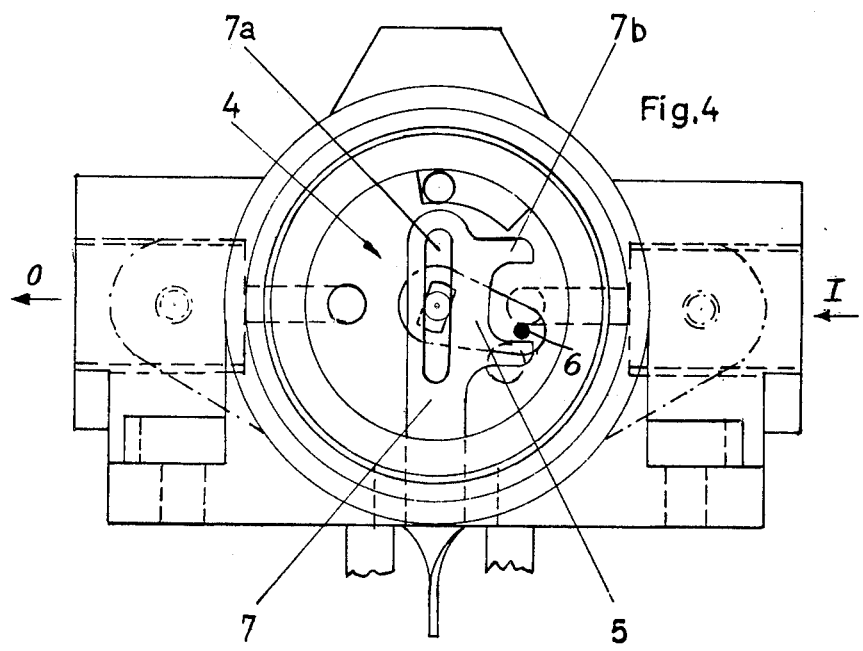
FIG. 4 is an end view of the upper part of the housing of FIG. 1, as seen in the direction of arrow A in FIG. 3.

In FIG. 4, which is an end view from the left-hand side of FIG. 3, the valve discs 4a are shown in the oppositely switched position in which the valve chamber VR1 is open to the valve channel V2, while the valve channel V1 is closed to the valve chamber VR1. This means that the incoming liquid, instead of flowing through valve chamber VR1, flows through valve chamber VR2, and the outgoing liquid flows through the opposite valve chamber. The two valve discs 4a and 4b are axially displaceable on the valve shaft 2, while under the bias from the spring washers 34, but they are rotationally fixed with respect to the central valve shaft 2. The latter in turn is axially floating with respect to the dividing wall 40, within the opposing biases of the spring washers 34. A small O-ring 3 seals the shaft 2 against leaks from one valve chamber to the other.

Figure 2:
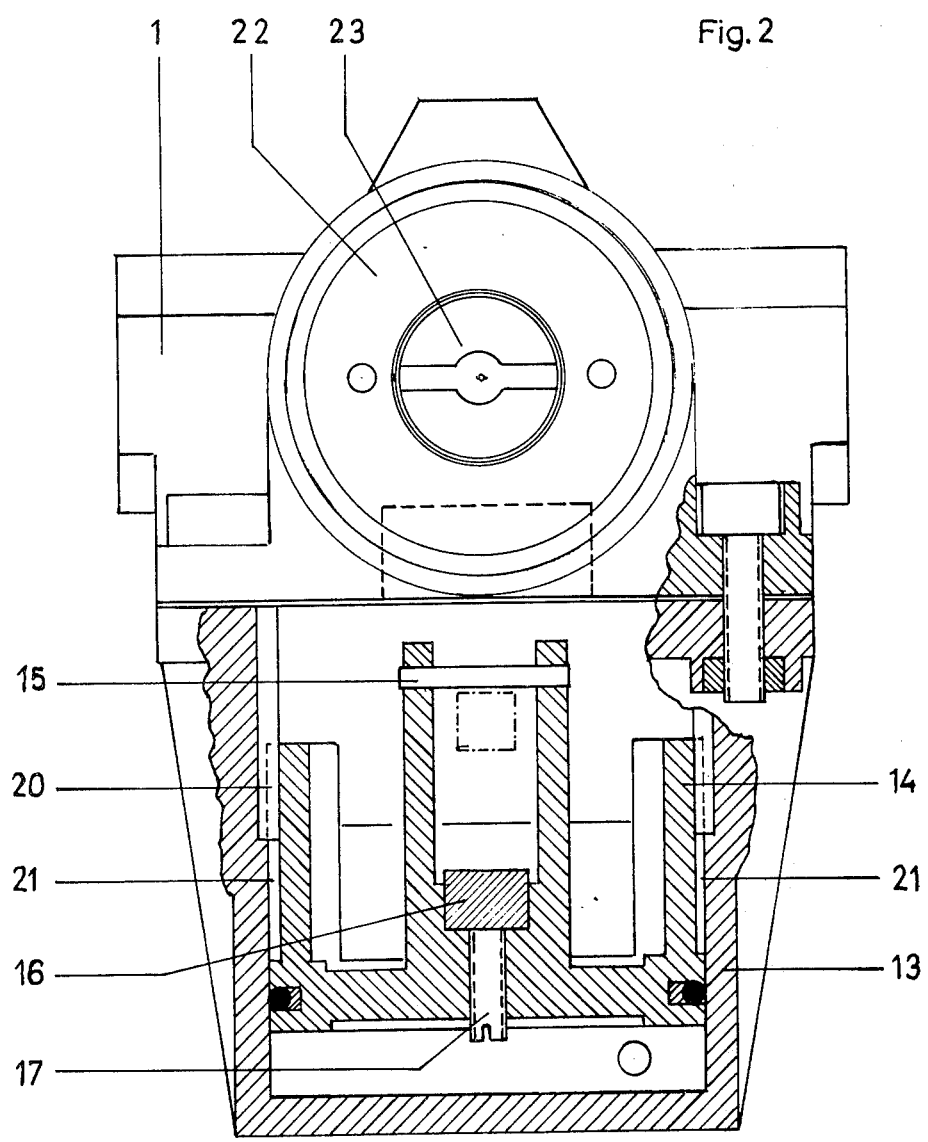
FIG. 2 is an end view of the apparatus of FIG. 1, from the right-hand side thereof, particularly in vertical cross section.
Figure 5:
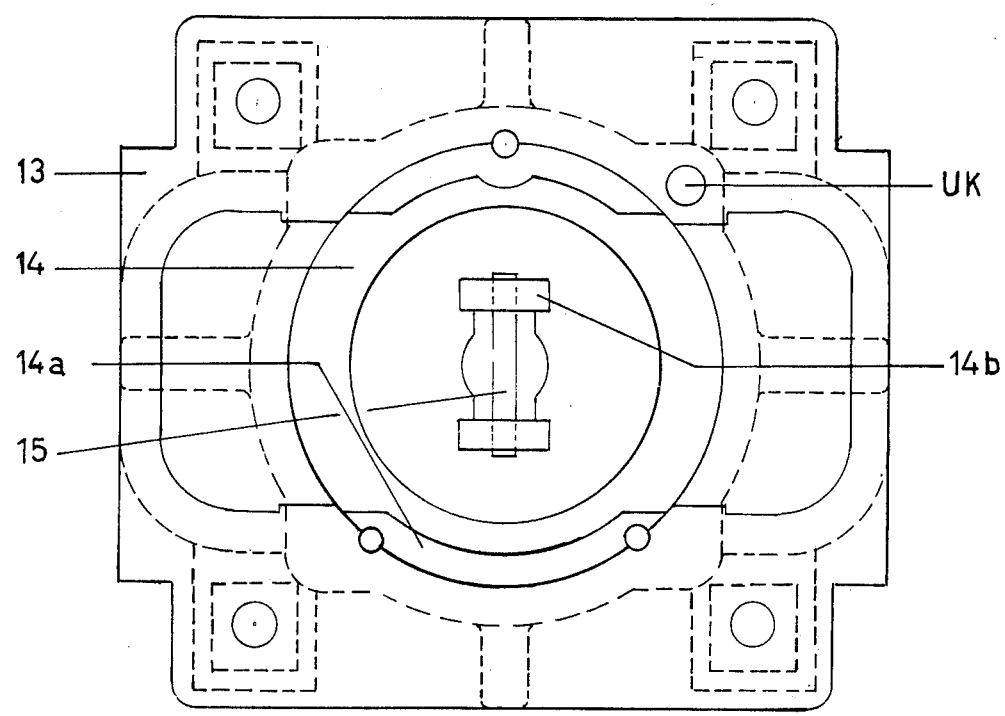
FIG. 5 shows in a plan view the lower part of the housing of FIG. 1 with the metering piston.
Figure 7:
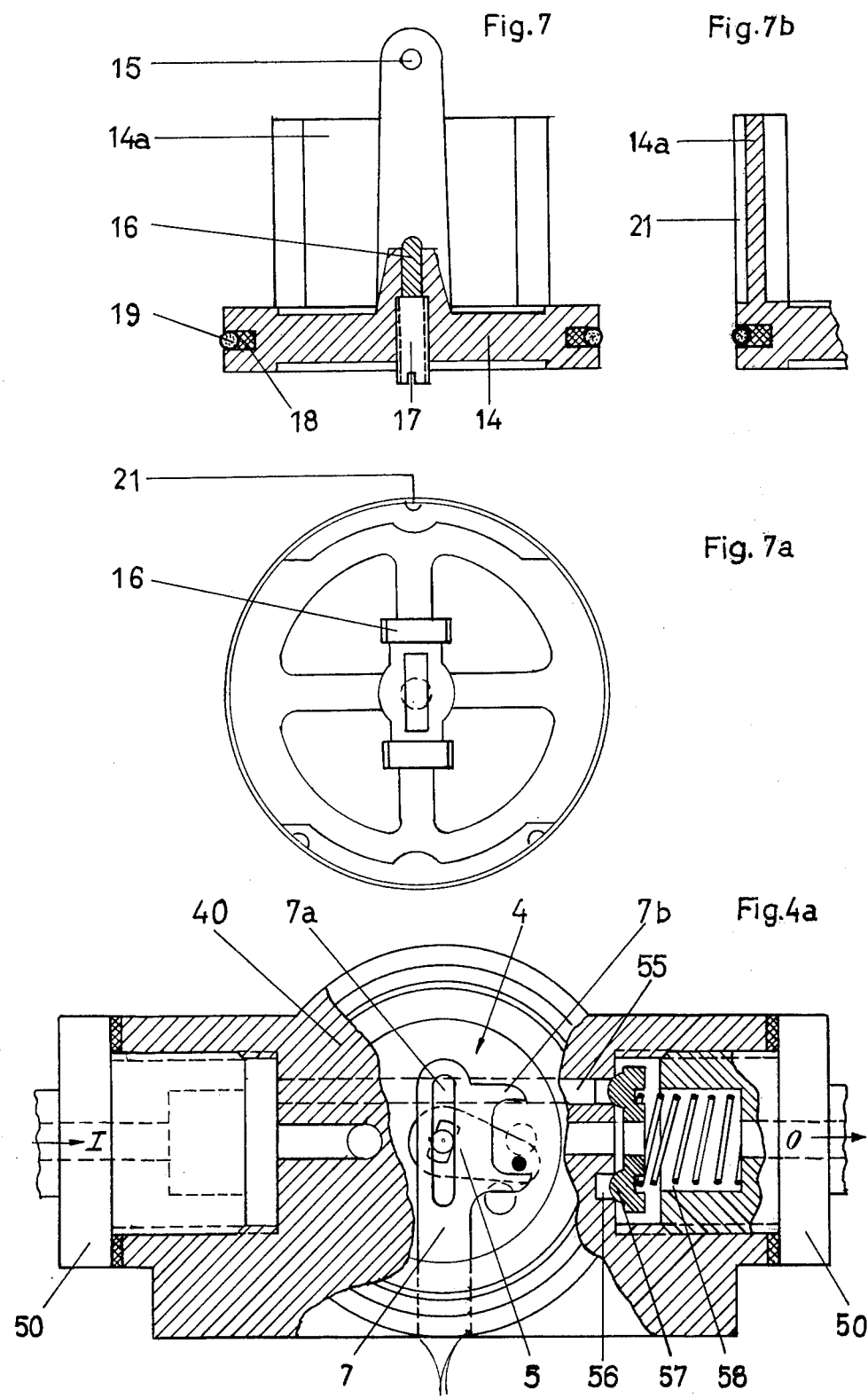
FIG. 7 shows the metering piston of FIG. 1 in a longitudinal cross section.

As can be seen in FIG. 1, the lower portion of the apparatus contains within the cylinder housing 13 a metering piston 14 which is vertically movable inside the latter. The piston 14 is sealed against the wall of the cylinder bore by means of an O-ring 19, the latter being radially outwardly biased by means of a resilient supporting ring 18 (FIG. 17). The metering piston 14, which is illustrated in more detail in FIGS. 7, 7a and 7b, has a skirt portion 14a in which are arranged three angularly spaced longitudinal grooves 21. The cylinder wall of housing 13 has matching grooves (see FIG. 2 or FIG. 5) holding longitudinal guide keys 20 or, alternatively, several guide balls. These guide means prevent the metering piston 14 from becoming jammed against the wall of the cylinder housing 13.

The metering piston thus divides the space of the cylinder housing 13 into an upper metering chamber M1 and a lower metering chamber M2, the metering chamber M1 communicating with the valve chamber VR1, and the metering chamber M2 communicating with the other valve chamber VR2, via a bypass channel UK leading outside the upper metering chamber M1 into the valve chamber VR2.

Figure 6:
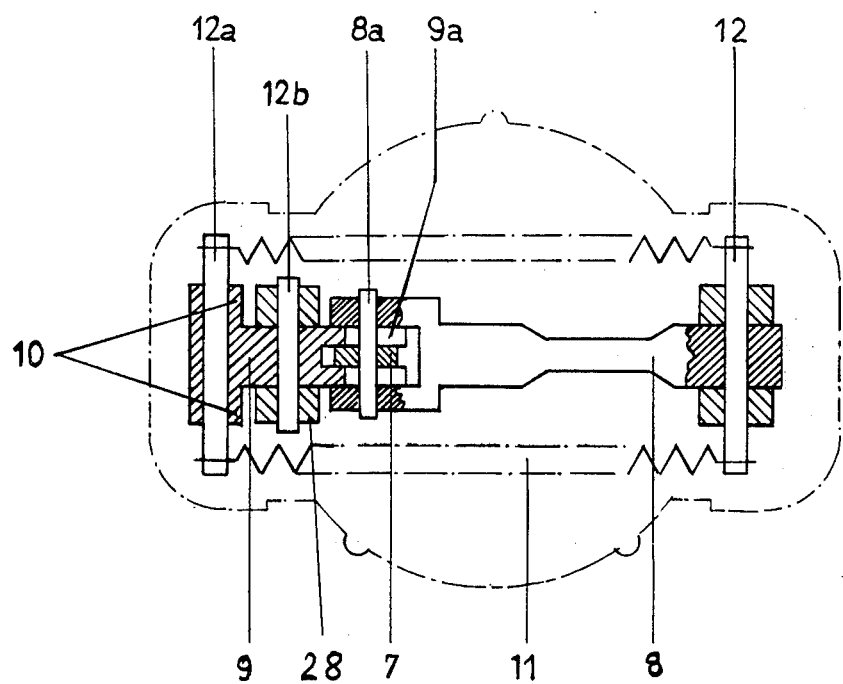
FIG. 6 shows in a plan view the toggle mechanism of the embodiment of FIG. 1, as sectioned along line IV—IV thereof.

The metering piston 14 also carries in its center a vertically oriented yoke-like extension with an upper abutment member 15 and a lower abutment member 16. The latter is vertically adjustable by means of a set screw 17, thereby increasing or decreasing the distance between the two abutment members. In the space between the abutment members 15 and 16 is arranged a toggle mechanism, as can best be seen in FIGS. 1 and 6. This toggle mechanism includes two fixed pivot pins 12 and 12b at opposite sides of the piston axis, pivot pin 12 carrying one extremity of a long toggle lever 8, and pivot pin 12b carrying a short toggle lever 9 by its midportion. The toggle levers 8 and 9 are connected to each other by means of a connecting pin 8a attached to the free extremity of toggle lever 8, pin 8a engaging a slot 9a in the cooperating end portion of toggle lever 9. This lever carries in its opposite end portion a pin 12a, and between this pin and pivot pin 12 of lever 8 are extended two toggle springs 11 (FIG. 6) which tend to pivot the short toggle lever 9 away from the dead center position in which it is shown in FIG. 1. The two end positions of the toggle levers are determined by upper and lower abutment noses 10 on the far end portion of the short toggle lever 9, the noses 10 engaging the bearing bracket 18 inside which the pivot pin 12b is retained.

The toggle mechanism is actuated by the two abutment members 15 and 16 of the metering piston 14, depending on whether the latter is moving upwardly, as implied by the position shown in FIG. 1, when the entering liquid flow passes through valve chamber VR2 and bypass channel UK into the lower metering chamber M2, or whether the entering liquid flow passes through valve chamber VR1 directly into the upper metering chamber M1. During the major part of its stroke, the metering piston moves without contact with the toggle mechanism, i.e. with a minimum of frictional resistance. Only as the abutment member 16 reaches the downwardly angled long toggle lever 8, is additional force required in order to move the toggle mechanism to dead center (cf FIG. 1). From this point on, the toggle mechanism tends to snap quickly to the opposite side, releasing energy rather than absorbing energy from the piston movement.

The movement of the toggle mechanism from dead center to its angled rest position is utilized to switch the rotary disc valve 4 from one position to the other. For this purpose, the toggle mechanism carries a vertical connecting rod 7 at its connecting pin 8a, the connecting rod 7 transmitting the motion of the toggle mechanism to the valve shaft 2 by means of a crank 5, as can best be seen in FIGS. 3 and 4. However, only that portion of the toggle lever motion which involves release of energy from the toggle springs is utilized to move the rotary valve, the connecting rod 7 having a lateral recess defined between vertically spaced driving noses 7b which is wider than the diameter of the cooperating driving pin 6 of crank 5 by an amount equal to approximately one-half the vertical motion of the connecting pin 8a of the toggle mechanism. The upper portion of the connecting rod 7 is guided on the valve shaft 2 by means of a vertical slot 7a in the connecting rod with which it engages shaft 2 between two snap retainers. The distance of the driving pin 6 on the crank 5 to the center of the valve shaft 2 may be made adjustable, in order to increase or decrease the force which is necessary for the movement of the rotary disc valve 4. This movement is comparatively small in terms of angular motion, as can be seen in FIG. 4. While the representation of FIG. 3 shows the incoming liquid flow passing through the valve chamber VR1, from which it enters the upper metering chamber M1, the position shown in FIG. 4 is the opposite one, viz. the valve chamber VR1 being connected to the outlet port O. Consequently, while in the earlier-mentioned position the metering piston moves downwardly, in the latter position it moves upwardly, since the incoming liquid passes into valve chamber VR2 and from there into the lower metering chamber M2. In each case, the metering piston 14 actuates the toggle mechanism just before reaching the end of its stroke, thereby switching the rotary disc valve 4 to the opposite position and reversing the liquid flow through the valve chambers and metering chambers.

There are, of course, various ways of modifying the details of the apparatus itself, as for example, by eliminating the slot 9a at the inner end of the short toggle lever 9 (FIGS. 1 and 6), and by providing instead a longitudinal slot in the mid-portion of the short toggle lever 9, where it engages the fixed pivot pin 12b. This version brings the outer extremity of the short toggle lever 9 further to the left, when the toggle mechanism reaches dead center, thereby increasing the stretching effect on the toggle springs 11. This means, compared to the embodiment of FIG. 1, for example, that the modified toggle mechanism can store and release more energy, thereby accentuating the snap action, when it is triggered. In this case it is also possible to eliminate the abutment noses 1C on the outer extremity of lever 9, because the pin 12a can be utilized for this purpose, the latter abutting against the bearing bracket 18.

In the transverse dividing wall 40 is further arranged a longitudinal bypass channel 36 in parallel alignment with the valve channels V1 and V2. This bypass channel 36, however, is not closable by the two valve discs 4a and 4b, but is blocked by means of a stop cock 33 during normal metering operations. Channel 36 may be opened by rotating the plug of the stop cock 33, as for example, when the apparatus is blocked or otherwise out of operation, in which case the valve chambers VR1 and VR2 and the metering chambers M1 and M2, are short-circuited.

In the modified embodiment illustrated in FIG. 4a, the threaded bores of the intake port I and outlet port O are larger in diameter than those of FIG. 4, the enlarged threaded bores being adapted for the insertion of threaded hose connectors 50. The dividing wall 40 separating the two valve chambers VR1 and VR2 contains a bypass channel 55 which directly links the intake and outlet ports. This channel 55, which serves as an emergency bypass, communicates with an annular groove 56 at the bottom of the outlet port O, the groove 56 being concentric in relation to the port. The annular groove 56 is covered by a disc 57 with a central passage. On its side facing the annular groove 56 the disc 57 carries a sealing bead of plastic material, for example, which closes the annular groove 56. The opposite side of the disc 57 is engaged by a preloaded compression spring 58, the preload of spring 58 being adjustable through the depth of insertion of the threaded hose connector. This combination serves as a pressure relief valve, opening when a certain pressure buildup is reached. This event may occur, when the metering apparatus is blocked or otherwise inoperative. The automatic opening of the emergency bypass then permits continuous supply of fuel to the engine, for example.

Figure 9:
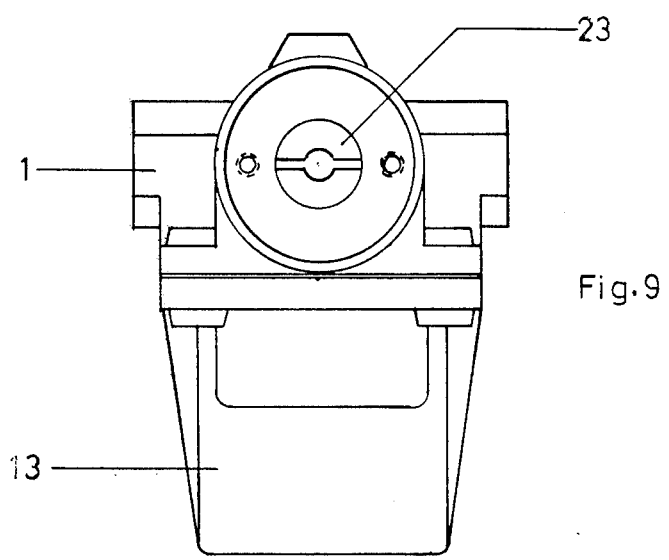
FIGS. 9 and 9a illustrate, in an elevational end view and in a plan view, respectively, the apparatus of the invention in approximately its actual size.
Figure 9A:
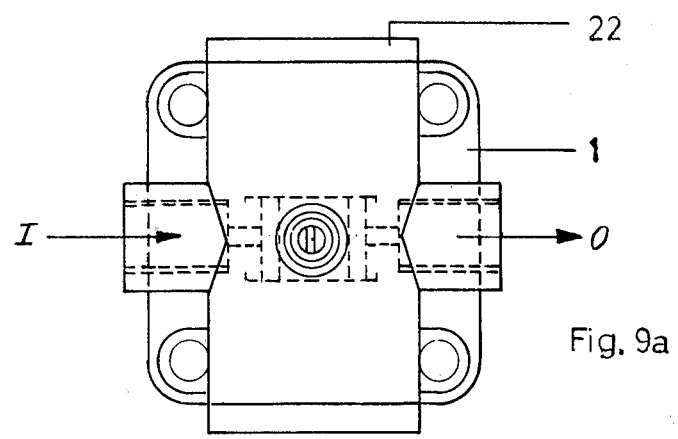
Figure 9B:
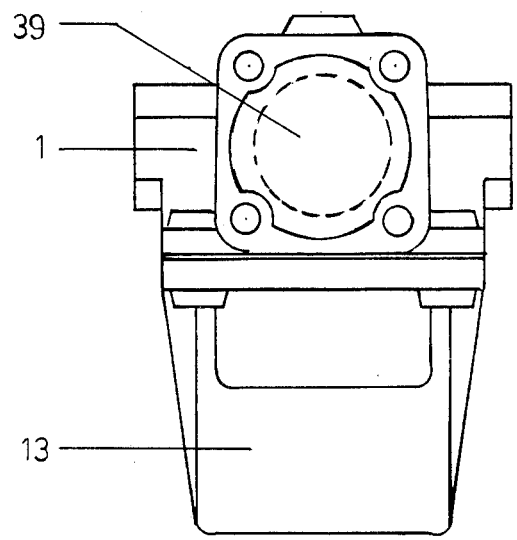
FIGS. 9b and 9c are views similar to FIGS. 9 and 9a, showing a modified apparatus embodying the invention using a mechanical counter.
Figure 9C:
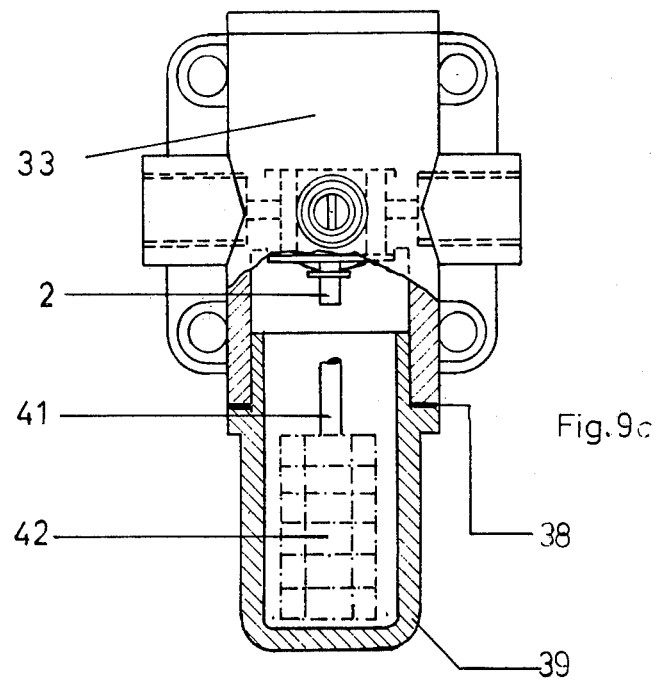

The angular reciprocating switching motion of the rotary disc valve 4, of which each successive motion is indicative of a given volume of liquid flow, can be conveniently utilized to operate a counting means. This may be done, for example, by using the valve motion to drive a mechanical counter 42, as is schematically indicated in FIG. 9c. The representation of FIGS. 9b and 9c indicates a counter which is coaxially coupled to the valve shaft 2 by means of the elongated shaft 41 of the counter 42.

Figure 8:
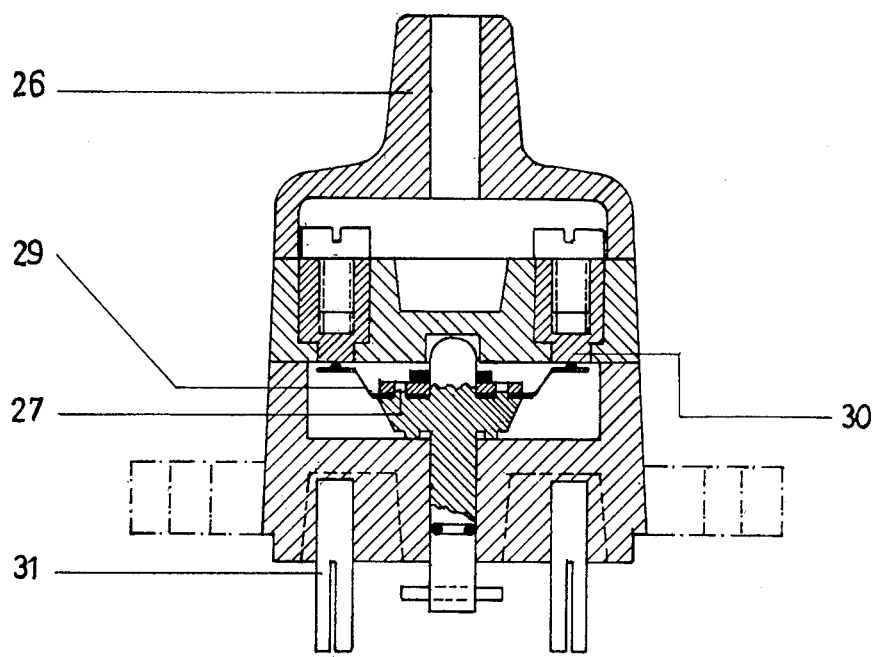
FIG. 8 is a longitudinal cross section through a pulse giver unit, adapted for plug-in connection to the flow meter of FIG. 1.
Figure 8A:
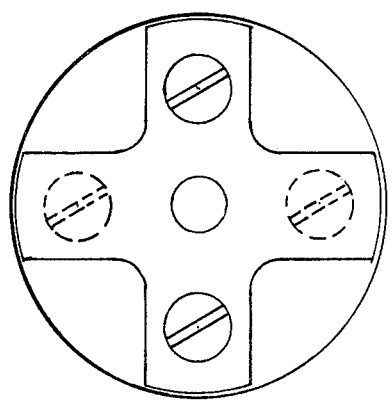
FIG. 8a is a plan view of the unit of FIG. 8 with the cover removed.
Figure 8B:
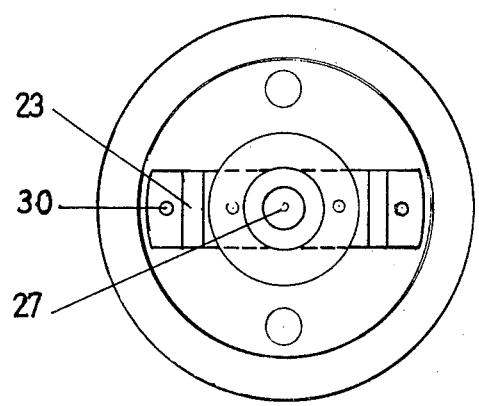
FIG. 8b is a view from underneath at the inside of the unit of FIG. 8.

It may be more desirable, however, to place the counting means remotely from the metering apparatus itself, for which purpose it is preferable to use an electronic counter. For this, it will be necessary to couple a pulse giving unit to the rotary valve 4, an embodiment of such a unit being shown in FIGS. 8, 8a, and 8b. The electrical pulses produced by this unit can then be conveniently transmitted to an electronic digital counter, which may be located at any desired place.

The drive connection between the shaft 2 of the rotary valve 4 and the pulse giver shaft 27 of the pulse giver unit is preferably obtained by means of a magnetic coupling which permits the installation of a permanent stationary seal in the end plug 22 of the valve housing 1. To each side of a transverse sealing wall, which divides the center bore of the end plug 22 into an inner and outer portion, is arranged a small rotatable magnetic head 23, each head carrying a peripheral bearing sleeve 25 with which it engages the bore of plug 22. The two magnetic heads 23, which are similar in shape and oppositely oriented, have in one end thereof a transverse central slot adapted to be engaged by a pin carried on the valve shaft 2 or on the pulse giver shaft 27, respectively. The magnetic heads 23 which are of a permanently magnetized material, and further provided with bearing discs 24 on their extremities with which they engage the transverse sealing wall between them, the latter and the bearing discs 24 engaging each other with a minimum of rotary friction. Thus, the two magnetic heads 23, facing each other across the separating wall, transmit the switching motion of the rotary valve 4 to the pulse giver unit 26 without slippage and with a minimum of frictional resistance. The pulse giving unit itself is very simple in construction, having a plurality of fixed contact points 30 which are alternatingly wiped by a pair of pulse giver contacts on a pulse giver arm 29 carried by the pulse giver shaft 27. This pulse giver unit 26 is conveniently connectable to the end plug 22 of the valve housing 1 by means of two slotted pins 31 which engage appropriate bores in plug 22.

It should be understood, of course, that the foregoing disclosure describes only a preferred embodiment of the invention and that it is intended to cover all changes and modifications of this example of the invention which fall within the scope of the appended claims.

I claim:

1. A liquid flow meter, adapted particularly for the measurement of small volumes of liquid flow, as in pressure or suction-operated fuel feed systems, the flow meter comprising in combination:

a closed housing assembly having a flow inlet side with an inlet port, a flow outlet side with an outlet port, and a cylinder housing portion with a cylinder bore;

a metering piston arranged inside the cylinder bore for free reciprocating motion therein, whereby the piston sealingly separates the cylinder housing into a first and a second metering chamber;

internal connecting channels adapted for separately linking the inlet side and the outlet side of the housing to both metering chambers;

a switching valve controlling the liquid flow through said internal connecting channels by selectively closing them in such a way that, in a first valve position, a connecting channel between the inlet side and the first metering chamber and another connecting channel between the outlet side and the second metering chamber are open, so that the metering piston moves in the direction toward the second metering chamber and, in a second valve position, a connecting channel between the inlet side and the second metering chamber and another connecting channel between the outlet side and the first metering chamber are open, so that the metering piston moves in the opposite direction;

a toggle mechanism connected to the switching valve in such a way that the two rest positions of the toggle mechanism determine, respectively, said first and second positions of the switching valve; and means defined by the metering piston for actuating the toggle mechanism in response to the movement of said piston, as it reaches the end of its metering stroke;

each actuation of the toggle mechanism and connected switching valve being indicative of a given volume of liquid having passed through the flow meter, said actuation being interpretable as a flow rate by means of a counter; and wherein the housing assembly further includes a valve housing portion with a transverse dividing wall separating its interior space into first and second valve chambers which communicate, respectively, with said first and second metering chambers; and wherein the switching valve is a rotary disc valve, arranged in the dividing wall and including:

a central valve shaft being journalled in, and extending sealingly across said wall;

two valve discs rotatably connected to said shaft;

two oppositely facing parallel valve faces on the dividing wall; and two valve channels extending across the dividing wall between said faces, and serving as said connecting channels, being connected to the inlet side and outlet side of the housing, respectively, each valve channel defining a valve port in each valve face, which port is openable and closable by one of the two valve discs, through rotation of the latter.

2. A flow meter as defined in claim 1, wherein:

the connection between the toggle mechanism and the valve includes a connecting rod extending between the former and the latter, said rod having a connecting point defining a dead-motion clearance which permits movement of the toggle mechanism to approximately its dead center position, without a corresponding movement of the switching valve, in both directions of toggle movement.

3. A flow meter as defined in claim 1, wherein:

the two valve channels are arranged in parallel and diametrally opposite each other with respect to the valve shaft;

the valve discs are of a diameter adapted to cover said valve ports and include each two openings which are angularly so arranged on the discs that each opening in one disc shares an angular plane with a diametrally opposite opening of the other disc, the two pairs of opposite openings being angularly inclined with respect to one another in accordance with the angular distance between the first and second valve positions.

4. A flow meter as defined in claim 1, wherein:

the valve discs are axially displaceable on the valve shaft, and the valve shaft in turn is axially displaceable with respect to the dividing wall; and the rotary valve further includes biasing means on each side of the valve shaft engaging the valve discs for biasing them toward the valve faces, thereby axially positioning the valve shaft in a floating arrangement.

5. A flow meter as defined in claim 1, wherein:

the rotary valve further includes a crank fixedly attached to the valve shaft;

the connection between the toggle mechanism and the valve includes a connecting rod extending substantially perpendicular to the valve shaft, said rod being driven by the toggle mechanism to execute reciprocating motions; and the connecting rod has a longitudinal slot engaging the valve shaft, being guided thereagainst in its reciprocating motions, said rod further including spaced driving noses engaging the crank from opposite sides thereof, so as to drive the switching valve between its first and second positions in response to the reciprocation of the connecting rod.

6. A flow meter as defined in claim 5 wherein:

the spaced driving noses on the connecting rod define a dead-motion clearance with respect to the crank, which clearance permits movement of the connecting rod and toggle mechanism to approximately the dead center position of the latter, before the crank is engaged by one of the two driving noses.

7. A flow meter as defined in claim 1, wherein:

the valve housing portion is an injection-molded integral valve housing, having oppositely facing, sealable access openings in alignment with the shaft of the rotary disc valve and of a diameter larger than the latter;

the inlet port and outlet port are arranged in the valve having in substantially the same plane with said access openings and extend perpendicularly thereto at opposite sides of the transverse dividing wall and rotary valve; and the two valve channels extend likewise in substantially the same plane, being connected to the inlet and outlet ports, respectively, by straight bores in the dividing wall.

8. A flow meter as defined in claim 7, wherein:

the valve housing includes two end plugs sealingly closing its access openings; and one end plug includes means for transmitting the rotational motion of the valve shaft to the outside of the valve housing.

9. A flow meter as defined in claim 7, wherein:

the valve housing further includes:

an emergency bypass channel extending between the inlet and outlet ports, through the length of said dividing wall; and a relief valve arranged in said bypass channel, at the point where the latter opens into the outlet port.

10. A flow meter as defined in claim 9, wherein:

the bypass channel is a straight bore extending in a plane which is parallel to said plane defined by the inlet and outlet ports and by the valve channels;

the outlet port is a countersunk, threaded bore, having in its bottom an annular groove into which the bypass channel opens;

the relief valve includes: a disc adapted to sealingly engage said groove so as to be centered against it and to thereby close the bypass channel, and a spring urging the disc into said position with a force which can be overcome by a pressure surge in the incoming medium.

11. A flow meter as defined in claim 1, wherein:

the valve housing portion further includes an access opening in alignment with the shaft of the rotary disc valve and an end plug sealingly mounted in said opening;

the end plug is in the form of a hollow cap; and the flow meter further comprises a mechanical counter which is mounted inside the end plug and coupled to the valve shaft.

12. A flow meter as defined in claim 1, wherein:

the valve housing portion further includes an access opening in alignment with the shaft of the rotary disc valve and an end plug sealingly mounted in said opening;

the end plug includes: a center bore and a thin, transverse, non-magnetizable sealing wall dividing the bore into inner and outer bore portions; and a pair of permanently magnetized coupling members rotatably received in said bore portions, respectively, and engaging each other magnetically across the sealing wall, the inner coupling member being rotatably connected to the valve shaft; and the flow meter further comprises means for translating the motion of the outer coupling member into electronically countable pulses.

13. A flow meter as defined in claim 12, wherein:

each magnetic coupling member includes a bearing sleeve on its periphery engaging the respective bore portion of the end plug with a low coefficient of friction, and an end face with a bearing disc engaging the sealing wall of the end plug with a low coefficient of friction.

14. A flow meter as defined in claim 12, wherein:

the translating means is a pulse giver unit which is connectable to the end plug and includes:

a housing with a center axis in alignment with the end plug and with said outer magnetic coupling member;

a plurality of fixed contacts carried by the housing in a common radial plane, said contacts leading to a source of electric potential;

a pulse giver shaft journalled in the center axis of the housing; and a conductive, flexible wiper arm attached to the pulse giver shaft and carrying at least two wiper contacts, whereby the rotation of said shaft in unison with the switching valve establishes alternating connections for electric pulses between different pairs of fixed contacts, when they are bridged by the wiper contacts and the wiper arm.

15. A flow meter as defined in claim 1, wherein:

the toggle mechanism actuating means defined by the metering piston includes two abutment members solidary therewith and axially spaced along the piston axis; and the toggle mechanism includes:

a pivotable toggle lever extending transversely to the piston axis between the two abutment members so as to be movable by the latter, as the piston moves;

the spring means urging the toggle lever away from a median dead center position into one of two oppositely pivoted rest positions; and means for abutting the toggle mechanism in both rest positions.

16. A flow meter as defined in claim 15, wherein:

the toggle mechanism includes:

two straight, pivotable toggle levers of which one is long and the other one is short, the first, earlier-mentioned toggle lever being the longer one of the two and having a fixed pivot point at one end thereof, which point is located a distance from the piston axis, its opposite free end extending a distance beyond said axis;

the second, short, pivotable toggle lever has one end connected to the free end of the long toggle lever and extends away from the latter substantially in alignment therewith, when the levers are in their dead center position, said short lever having a pivot point at a distance from its connection with the long lever; and the spring means includes at least one tension spring which is connected by one end to a point on the short lever which is located a distance outside its pivot point, said spring having its other end fixed at a distance inside said pivot point, both connection points of the tension spring being in alignment with the pivot points of the two levers, when the latter are in their dead center position.

17. A flow meter as defined in claim 16, wherein:

the connection between the two toggle levers includes a pin attached to one of the levers and a longitudinal slot in the other lever.

18. A flow meter as defined in claim 16, wherein:

the connection between the two toggle levers includes a pin engaging a bore in each lever; and the pivot point of the short lever includes a fixed pin which engages a longitudinal slot in the mid-portion of said lever.

19. A flow meter as defined in claim 16, wherein:

the toggle mechanism abutting means includes two abutment noses on the far end of the short toggle lever, said noses engaging portions of the housing assembly in the two rest positions of the toggle mechanism.

20. A flow meter as defined in claim 15, wherein:

the toggle mechanism actuating means further includes means for adjusting the axial distance between the two abutment members, whereby the stroke of the metering piston is adjustable in length.

21. A flow meter as defined in claim 20, wherein:

the toggle mechanism actuating means includes a yoke extension on the metering piston;

the toggle lever reaches through the yoke extension;

one of the two abutment members is defined by the far end portion of the yoke;

the other, adjustable, abutment member is arranged underneath the yoke; and the abutment member adjusting means includes a recess receiving the adjustable abutment member and an adjustable set screw positioning it axially.

22. A flow meter as defined in claim 1, wherein:

the metering piston includes a peripheral groove, an O-ring received in said groove, and an elastic supporting ring received in the same groove radially underneath the O-ring.

23. A flow meter as defined in claim 1, wherein:

the metering piston includes a piston wall and a plurality of longitudinal guide grooves in said wall; and the cylinder bore of the housing assembly includes means for guiding the metering piston by engaging the guide grooves of the piston.

24. A flow meter as defined in claim 23, wherein:

the piston guide means in the cylinder bore includes longitudinal grooves in the housing wall in alignment with the guide grooves of the metering piston and guide members engaging each pair of aligned grooves.

25. A flow meter as defined in claim 24, wherein said guide members are balls.

26. A flow meter as defined in claim 1, further comprising:

a bypass channel linking the inlet side of the housing with its outlet side;

a normally closed shutoff valve arranged in the bypass channel, said valve being openable, in order to inactivate the metering operation of the apparatus.

27. A flow meter as defined in claim 26, wherein:

the shutoff valve is spring-biased toward its closed position, being openable by the action of the liquid medium, in the event of a pressure surge.

28. A liquid flow meter, adapted particularly for the measurement of small volumes of liquid flow, as in pressure or suction-operated fuel feed systems, the flow meter comprising in combination:
- a closed housing assembly having a flow inlet side with an inlet port, a flow outlet side with an outlet port, and a cylinder housing portion with a cylinder bore;
- a metering piston arranged inside the cylinder bore for free reciprocating motion therein, whereby the piston sealingly separates the cylinder housing into a first and a second metering chamber;
- internal connecting channels adapted for separately linking the inlet side and the outlet side of the housing to both metering chambers;
- a switching valve controlling the liquid flow through said internal connecting channels by selectively closing them in such a way that, in a first valve position, a connecting channel between the inlet side and the first metering chamber and another connecting channel between the outlet side and the second metering chamber are open, so that the metering piston moves in the direction toward the second metering chamber and, in a second valve position, a connecting channel between the inlet side and the second metering chamber and another connecting channel between the outlet side and the first metering chamber are open, so that the metering piston moves in the opposite direction;
- a toggle mechanism connected to the switching valve in such a way that the two rest positions of the toggle mechanism determine, respectively, said first and second positions of the switching valve; and
- means defined by the metering piston for actuating the toggle mechanism in response to the movement of said piston, as it reaches the end of its metering stroke;
- each actuation of the toggle mechanism and connected switching valve being indicative of a given volume of liquid having passed through the flow meter, said actuation being interpretable as a flow rate by means of a counter;
- the toggle mechanism actuating means defined by the metering piston including two abutment members solidary therewith and axially spaced along the piston axis;
- the toggle mechanism including:
  - a pivotable toggle lever extending transversely to the piston axis between the two abutment members so as to be movable by the latter, as the piston moves;
  - spring means urging the toggle lever away from a median dead center position into one of two oppositely pivoted rest positions; and
  - means for abutting the toggle mechanism in both rest positions; and
- wherein the housing assembly further includes a valve housing portion with a transverse dividing wall separating its interior space into first and second valve chambers which communicate with said first and second metering chambers, respectively;
- the switching valve is a rotary valve arranged in the dividing wall and includes a valve shaft extending perpendicularly to said wall;
- the longitudinal axis of the cylinder bore and metering piston is perpendicular to the axis of the valve shaft and substantially in alignment with the latter in a common plane;
- the toggle lever extends substantially parallel to the valve shaft, moving perpendicularly thereto; and
- the connection between the toggle mechanism and the rotary valve includes a crank on the valve shaft and a connecting rod extending perpendicularly to the toggle mechanism and to said shaft, said rod transmitting motion from the toggle lever to the crank on the valve shaft, thereby rotating the valve.

* * * * *